(12) United States Patent
Lee (10) Patent No.: US 7,092,782 B2
(45) Date of Patent: Aug. 15, 2006

(54) SYSTEMS AND METHODS FOR IMPROVED APPAREL FIT

(75) Inventor: Cricket Lee, Santa Fe, NM (US)

(73) Assignee: Mbrio L.L.C., Dallas, TX (US)

( * ) Notice: Subject to any disclaimer, the term of this patent is extended or adjusted under 35 U.S.C. 154(b) by 0 days.

(21) Appl. No.: 10/804,853

(22) Filed: Mar. 19, 2004

(65) Prior Publication Data

US 2005/0022708 A1    Feb. 3, 2005

Related U.S. Application Data

(60) Provisional application No. 60/456,307, filed on Mar. 20, 2003.

(51) Int. Cl.
    *G06F 19/00*    (2006.01)
(52) U.S. Cl. .................................. 700/132
(58) Field of Classification Search ........... 700/130, 700/131, 132, 133, 134, 135; 356/625, 629; 345/419
    See application file for complete search history.

(56) References Cited

U.S. PATENT DOCUMENTS

| | | |
|---|---|---|
| 3,939,565 A | 2/1976 | Bush |
| 3,979,831 A | 9/1976 | Lutz |
| 4,104,800 A | 8/1978 | Dyal |
| 4,114,277 A | 9/1978 | Chalker |
| 4,149,246 A | 4/1979 | Goldman |
| 4,546,434 A * | 10/1985 | Gioello .................... 700/90 |
| 4,868,990 A | 9/1989 | Steinberg |
| 4,916,624 A | 4/1990 | Collins et al. |
| 4,916,634 A | 4/1990 | Collins et al. |
| 4,926,344 A | 5/1990 | Collins et al. |
| 4,995,514 A | 2/1991 | Forschner |
| 5,163,007 A * | 11/1992 | Slilaty .................... 700/132 |
| 5,548,519 A * | 8/1996 | Park et al. ................ 700/135 |
| 5,619,799 A | 4/1997 | Keung-Lung et al. |
| 5,680,314 A * | 10/1997 | Patterson et al. ........... 700/132 |
| 5,680,528 A | 10/1997 | Korszun |
| 5,757,661 A * | 5/1998 | Surville .................... 702/155 |
| 5,768,135 A * | 6/1998 | Park et al. ................ 700/130 |
| 5,930,769 A * | 7/1999 | Rose ...................... 705/27 |
| 5,956,525 A | 9/1999 | Minsky |
| 5,974,400 A | 10/1999 | Kagami et al. |
| 6,101,424 A | 8/2000 | Sawada |

(Continued)

OTHER PUBLICATIONS

National Textile Center Research Year 8 Proposal; Understanding the Apparel Fit Preferences of Female Consumers, accessed at www.auburn.edu on Feb. 14, 2003.

*Primary Examiner*—John J. Calvert
*Assistant Examiner*—Brian Kauffman
(74) *Attorney, Agent, or Firm*—Gardere Wynne Sewell LLP (57) ABSTRACT

Systems and methods for providing garments with improved and customized fits to one or more target consumer groups fit are described in the present invention. One method provides for a garment fit to a target consumer group comprising the steps of determining common body types for the target consumer group, establishing customized body measurement standards for each body type, selecting at least one real fit model for each body type, creating a sample garment in a range of sizes using grading rules, checking each sample garment on a fit model selected for each size and body type, preparing a block for each sample garment size and body type, and using the block to provide a garment fit for a target consumer group. Additional aspects are also disclosed.

33 Claims, 8 Drawing Sheets

U.S. PATENT DOCUMENTS

| | | |
|---|---|---|
| 6,286,224 B1 | 9/2001 | Lewis |
| 6,311,403 B1 | 11/2001 | Macrini |
| 6,353,770 B1 | 3/2002 | Ramsey et al. |
| 6,415,199 B1 | 7/2002 | Liebermann |
| 6,473,671 B1 | 10/2002 | Yan |
| 6,546,309 B1 * | 4/2003 | Gazzuolo ............. 700/132 |
| 6,564,118 B1 * | 5/2003 | Swab ............. 700/131 |
| 6,665,577 B1 * | 12/2003 | Onyshkevych et al. ..... 700/130 |
| 6,701,207 B1 * | 3/2004 | Gazzuolo ............. 700/132 |
| 2002/0103566 A1 | 8/2002 | Gadson |
| 2002/0123821 A1 | 9/2002 | Ramsey et al. |
| 2002/0138170 A1 | 9/2002 | Onyshkevyach et al. |
| 2002/0188372 A1 | 12/2002 | Lane et al. |

* cited by examiner

SYSTEMS AND METHODS FOR IMPROVED APPAREL FIT

CROSS-REFERENCE TO RELATED APPLICATIONS

This application claims the benefit of U.S. Provisional Application No. 60/456,307, filed on Mar. 20, 2003, herein incorporated by reference.

BACKGROUND OF THE INVENTION

The present invention relates to systems and methods for designing and producing apparel, particularly apparel designed and produced for one or more target consumers based on new and improved fit specifications.

Apparel fit problems continue to plague consumers, retailers and apparel companies—pants that are too short, a dress that droops about the shoulders, a waist that is too big, shorts that sag in the rear or bunch up between the legs. For consumers, fit problems negatively impact their retail shopping experience, level of apparel spending and brand satisfaction. The cost to apparel companies and retailers is tangible as well as intangible: high rates of returned merchandise, lost potential sales, and brand equity erosion. Even for those apparel brand owners who believe they have solved the fit problem for a "target consumer," there is a high loss in revenue when a consumer leaves with only a single pair of pants because only one out of five pairs fit properly. Returns on women's apparel are estimated to be approximately 10–12% of sales. According to a 2002 study, more than 25% of these returns are due to inconsistent or incorrect fit. Store front retailers process nearly $5 billion in returned merchandise each year. Catalog and eCommerce apparel returns range from 33–35% with the largest single reason for return being "poor fit."

Currently, apparel fit specifications are based on an industry sizing standard established in the 1940's by The American Society for Testing and Materials (ASTM). This standard has never been updated or revised. Thus, it has become obsolete as body sizes and physiognomy of the any target population has evolved over the last half century. Today, for example, ASTM standard specifications can only provide off-the-rack fit for roughly 13% of women aged 35–55. Apparel companies have been forced to apply their own insights to "tweak" fit specifications, and have achieved only a limited amount of success. In addition, companies now apply "vanity sizing" to many apparels, such that larger sized clothing are labeled with smaller sizes. Together, this has resulted in the dilution of size standards which has only increased consumer confusion, while failing to deliver appreciable improvements in fit.

Apparel fit and sizing are top concerns for apparel brands and retailers worldwide. Based on a recent survey, 62% of consumers say they can't find clothes that fit well; 57% say their body shape won't fit into today's standard sizes; 51% say manufacturers don't make clothes for real bodies. Importantly, fit should include size and design preferences for each specific population, because of the preferred differences exhibited by younger people as compared with middle aged or elderly persons and among ethnic groups. As such, unlike current systems, body cathexis (self body image) must be considered along with body measurements in order to develop a satisfactory fit among targeted populations.

A clear need exists for an improved and more modern industry standard for designing and producing apparel that will provide a better fit for off-the-rack apparel and will dramatically reduce product returns, accelerate sales performance, and increase consumer confidence and loyalty.

SUMMARY OF THE INVENTION

The present invention solves the current problem associated with inefficient and ineffective apparel fit. As a consumer-based solution for designing and producing apparel, the present invention uses scientific data and market research to provide for apparel designed to fit any consumer profile or combination (including age, shape, ethnicity, product category, other consumer fit preferences and combinations, thereof). For example, the "middle missy" consumer segment (more than 38 million women born between 1946 and 1964, also known as "Baby Boomers") holds the most significant purchasing power of any consumer segment. Contrasted to ASTM's 13% fit performance for this segment, a research assessment of the present invention shows that the present invention will fit more than 75% of these women in off-the-rack apparel.

In one embodiment the present invention provides for a method for fitting a garment fit to a target consumer group comprising the steps of determining common body types for the target consumer group, establishing customized body measurement standards for each body type, selecting at least one real fit model for each body type, creating a sample garment in a range of sizes using grading rules, checking each sample garment on a fit model selected for each size and body type, preparing a block for each sample garment size and body type, and using the block to provide a garment fit for a target consumer group.

In another embodiment, the present invention provides for a system for preparing a custom fit garment comprising: quantitative and qualitative data, including body point measurements about the target consumer group used to establish customized body measurement standards; a sample garment created from the customized body measurements standards; a first real fit model with body measurements that fall within the customized body measurement standards used to fit the sample garment; one or more grading rules to create sample garments in a range of sizes for the target consumer group; and a second fit model selected from the target consumer group and used to perfect the fit of the sample garment and prepare a custom fit garment.

In still another embodiment, the present invention is a method of providing a custom fit garment comprising the steps of selecting a target group based on at least one criteria, conducting research about the target group to obtain data, identifying at least one body type from the data, providing size groupings for each body type, establishing customized body measurement standards for each size grouping, selecting a size in the middle of the size grouping to create a sample garment, checking the fit of sample garment on a real fit model with body measurements that conform with the customized body measurement standards, applying grading rules to the sample garment to obtain sample garments for the entire size grouping, checking the fit at selected sizes using a real fit model for each size, and creating a custom fit garment at each size and body type after fits are checked.

In yet another embodiment, the present invention provides for a method of offering complete specifications for one or more specific apparel segments, each segment being a product category in the apparel market (e.g., sportswear, swimwear, casual wear).

An advantage of the present invention is its comprehensive and accurate method of fitting any consumer without increasing retail inventories. As such, the present invention provides for increased sales without increasing inventory quantities.

Those skilled in the art will further appreciate the above-noted features and advantages of the invention together with other important aspects thereof upon reading the detailed description that follows in conjunction with the drawings.

BRIEF DESCRIPTION OF THE DRAWINGS

For more complete understanding of the features and advantages of the present invention, reference is now made to the detailed description of the invention along with the accompanying figures, wherein.

DETAILED DESCRIPTION OF THE INVENTION

Although making and using various embodiments of the present invention are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

In the description which follows like parts are marked throughout the specification and drawing with the same reference numerals, respectively. The drawing figures are not necessarily to scale and certain features may be shown exaggerated in scale or in a somewhat generalized or schematic form in the interest of clarity and conciseness.

In general, the present invention provides for an apparel standard system with the following features: (a) addresses fit by height, weight, category, ethnicity, and body shape; (b) incorporates the most current and authoritative scientific and academic data in existence; and (c) incorporates consumer preferences by size, age, ethnicity, and body shape into grade rules. Thus, the present invention enables any manufacturer or retailer to design, produce, and provide for consumer apparel with a consistent fit across all body types, ethnicities, and age groups, independent of brand.

The importance of consistent fit lies in the fact that there are significant physical differences among different ages of consumers. For example, a "size 12" 25-year-old woman is generally not the same shape nor has the same body type as a "size 12" 45-year-old woman, in part, due to gravity and other body/physical changes that occur with age. In addition, consumers exhibit different body types, even those of the same age, and as such, have different but specific design preferences that may be based, in part, on body cathexis.

Design preferences may include such things as colors, textures, jacket lengths, neckline shapes, and pocket placement. These design preferences are as important as the physical differences. For example, within an age-shape (or age-body type) group, sizes at the smaller end of the range (e.g., size 4 or 6) may prefer jacket lengths at the mid-hip, while sizes at the larger end (e.g., size 16 or 18) may prefer them below the hip. Ethnicity also plays a role in driving design preferences, e.g., some ethnicities prefer tighter fitting clothes than others.

Figure 1:
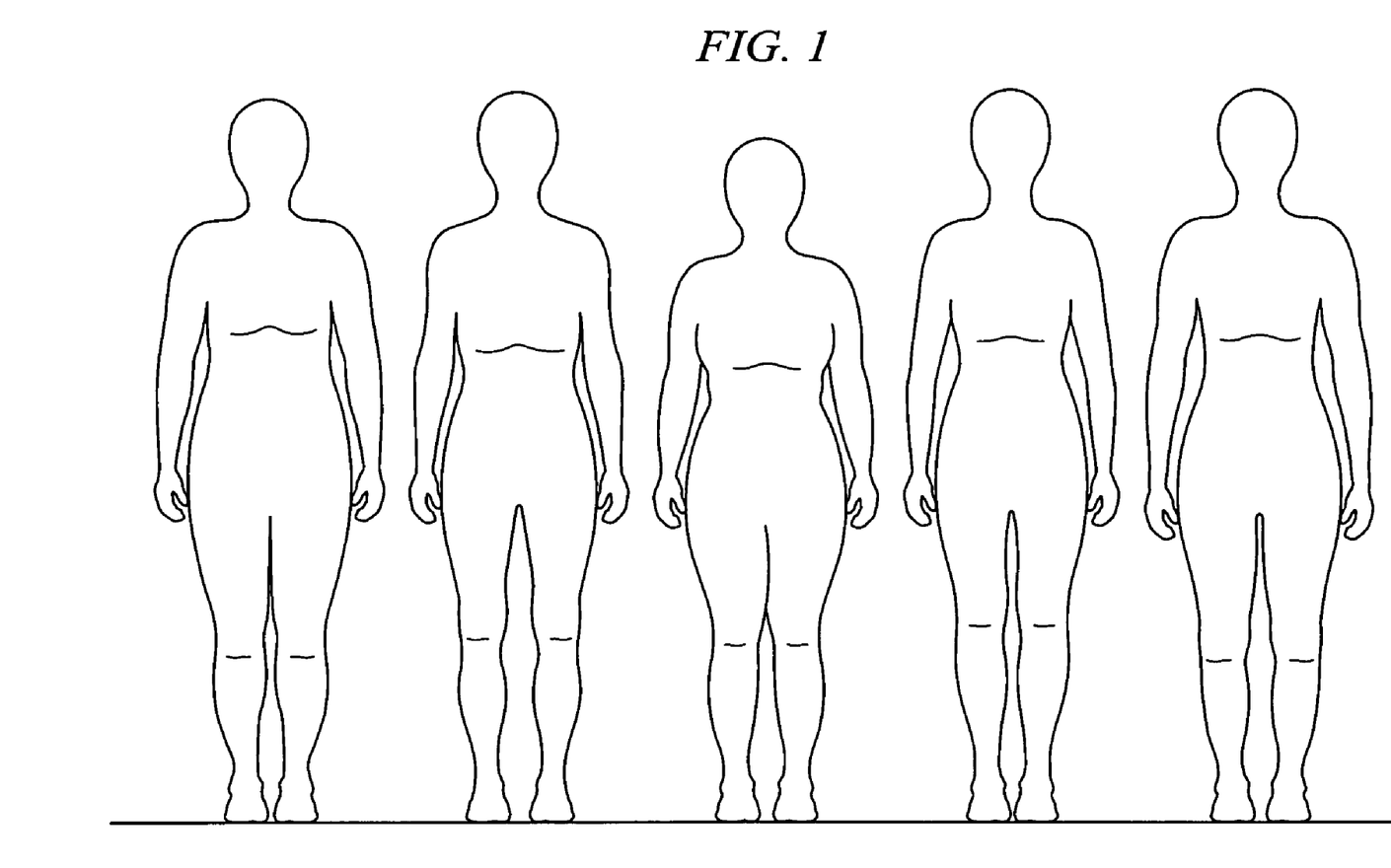
FIG. 1 depicts women with "size 10" shoulders, according to ASTM fit specifications in a frontal view.

Physical differences and design preferences may be extremely pronounced depending on an age group and/or ethnicity, in part, because there are many distinct body shapes and types within an age group. Examples of body types include average, full, straight, hourglass, curvy, and round. Additionally, body types may include tall, and petite. Importantly, apparel that fits one body type will not necessarily fit the same woman of the same size if a different body type. As shown in FIG. 1, women considered to be a "size 10," according to ASTM specifications, each exhibit differences in bust line, height, waist length, shoulder slope, posture and silhouette, and shape.

As such, the present invention is not intended to replace clothing design, but, in part, to provide a real body (i.e., fit model) that fits inside a specific design. All preferences provided by the present invention may be used to inform a design, if a designer chooses to use them. The present invention is also intended for fit technicians, production departments, and apparel companies.

A more detailed description of several aspects of the present invention is now provided.

Quantitative Research and Analysis

Quantitative research and analysis is performed regarding one or more target consumer groups in order to identify: common body measurements, body types, and preferences, as examples. Data is obtained about a target group, based on a set of criteria, from any of a number of sources, such as consumer surveys, market research, questionnaires, focus groups, interviews, apparel-related databases or inventories, and combinations thereof. Data may also include body measurements obtained from three-dimensional scanning of a target group. Data, whenever possible, is from a large enough group that statistically valid analysis may be performed.

Data from two or more sources may be compared or used in combination to validate findings from one source. For example, survey results may identify design preferences or indicate how poorly a garment fits. Such data may be used to set criteria for an analysis using an apparel-related database that houses three-dimensional body measurement data.

One of the features of the present invention is its ability to mine large apparel-related databases, such as the Textile Technology Corporation's SizeUSA (Size USA) national data, and marry it with scientific research. As such, a critical differentiation between the present invention and prior art is the approach taken by the present invention to mine the extensive SizeUSA national data in order to identify the following: the physiognomy of women's bodies as they age; the variances in body types related to ethnicity; the consumer preferences related to body size, body image and age. Such data mining, in combination with other data obtained from a target group, has provided specific and customized measurement standards for a target group that is used for the present invention.

In one embodiment, analysis includes sorting data for a specific target group (e.g., Baby Boomers) from a large database (e.g., SizeUSA data) into size ranges with defined upper and lower parameters for each size range. The data was sorted using ASTM standards in combination with other available body measurement guides currently used in the apparel industry. This allowed the data to be "sized" according to criteria that would benefit the consumer. After sorting the data by size, mean values were calculated, tolerance ranges were established, and upper and lower outliers may be discarded. Size ranges in each new grouping were then adjusted based on survey analysis (e.g., based on fit preferences, such as physical and design preferences). For example, by including body type fit preference, new "size" groupings were essentially created that included both body type and size criteria. Hence, for a target group such as Baby Boomers, new size groupings include body type adjustments to each size in bust and in hips, wherein two new size groupings replace the industry "standard" size, e.g., curvy size 10 and straight size 10 replace the industry standard size 10. Such new size groupings will work for all apparel for the Baby Boomer target group, such as for tops, bottoms, dresses, and skirts, as examples.

New Size Groupings

Through statistical analysis, a new sizing system is provided by the present invention. The customized system includes new size groupings that fall within the more conventional "sizing" scheme currently used in the industry. As described above, new size grouping are identified after initially searching a set of data using criteria based on current industry body measurement guides, such as ASTM.

After selecting a target group and a database that houses data for that specific target group, body measurement data from such a target group is categorized into "sizes" after modifying existing industry body measurement guides, such as ASTM. The categorization into the modified "sizes" applies adjustments to industry standard sizes in order to prevent consumer confusion. As such, ranges and tolerances in each group are modified from industry standard. The modifications, while based on industry standards, takes into account other standard body measurement guides used by industry that have evolved since ASTM was first conceived. Thus, new size groupings are created by applying industry standards with modifications to real data about a target group New size groupings are further modified by adjusting for fit preferences and body type. Information regarding fit preferences and/or body type are obtained from sources, such as surveys, questionnaires, and interviews. The information is translated into numerical data, generally about one or more specific body measurements, thus customized body measurement standards may also be adjusted based on fit preferences and body type.

Body Point Measurements

Figure 2:
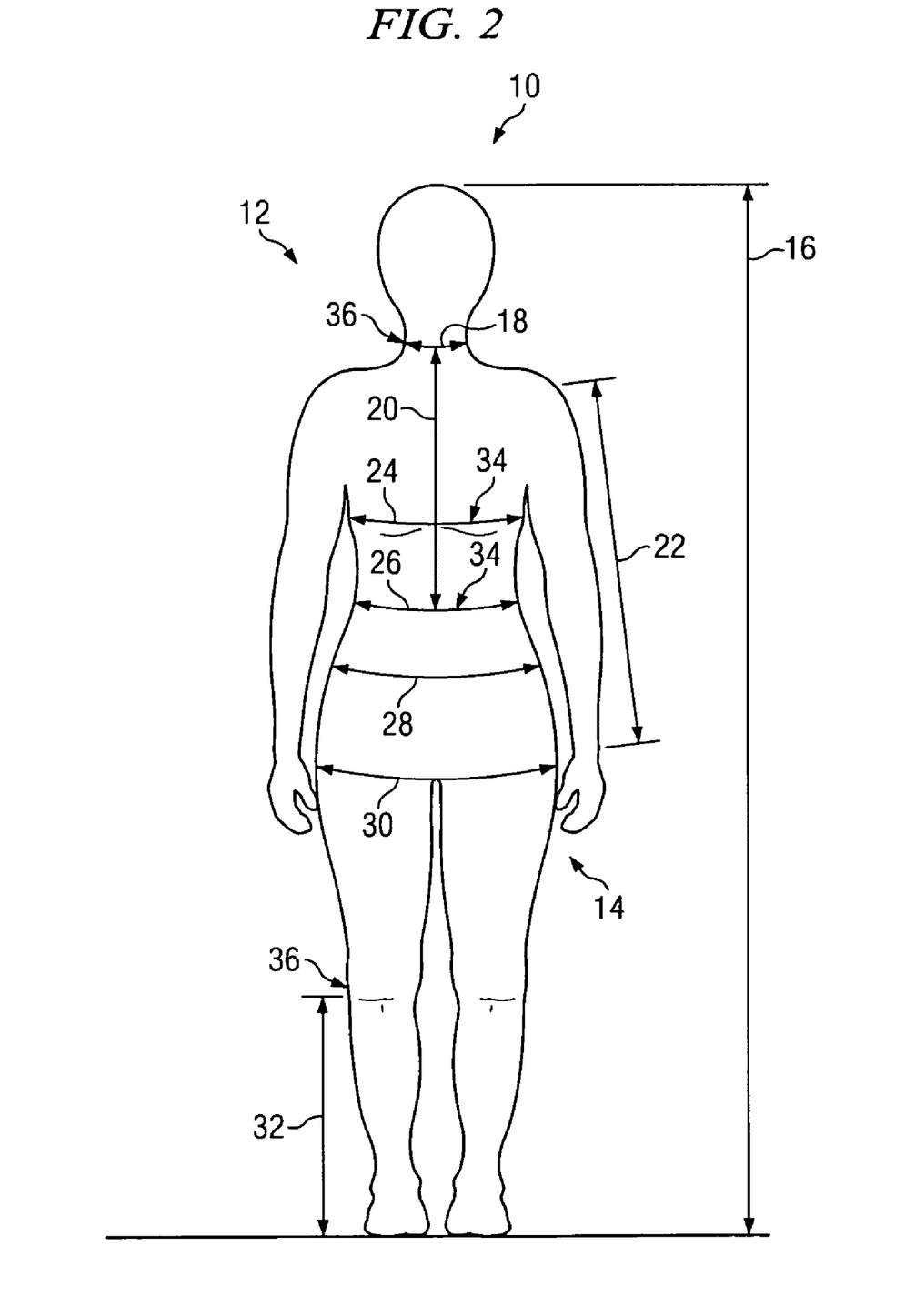
FIG. 2 is a front view of a body frame illustrating some typical body measurements in accordance with one aspect of the present invention.

The present invention identifies body point measurements considered critical, noncritical, and/or unnecessary. As shown in FIG. 2, typical body point measurements standards 12 are illustrated for a body frame 10. The body measurement standards 12 for body measurements at various body points of measurement 14 are well known in the art and include height 16, mid-neck 18, center front neck to waist 20, arm length from shoulder 22, bust 24, waist 26, high hip 28, low hip 30 and knee height 32. It will be understood that mid-neck 18, bust 24, waist 26, high hip 28 and low hip 30, for example, are measured about the circumference of the body at the location shown. Other common body measurements may be used.

Body points of measurement 14 may include critical body points of measurement 34 and non-critical body points of measurement 36. In general, critical body points of measurement are those points where apparel fit is considered important to the consumer. Non-critical body points of measurement are generally less important for apparel fit.

Customized Body Measurement Standards

Through statistical analysis, as described above, new customized measurement standards are provided by the present invention. As used herein, customized body measurement standards are body measurements that have been adjusted after real body measurement data (critical and noncritical points of measurement) are analyzed from a database. A good source of real body measurement data is from a database of scanned body measurements comprising several hundred body points per individual derived from three-dimensional scanning. Such a database, when housing statistically evaluable data about one or more target groups, allows such data to be analyzed within a specific target group (e.g., age, gender, ethnicity) and also allows preferences to be extracted from the data to create a customized set of body measurement standards.

After identifying a target group, body measurement data about that target group is evaluated based on industry standard body measurements (e.g., ASTM) and modified using current practices in the industry. This set of customized body measurement data may be further customized/modified after applying queries to the data regarding such things as body shape incidence and significance. New size-shape (body type) measurements for each target group are then created, as described above, wherein the industry standard body measurement for waist/girth is customized for each target group. For example, a "curvy" Baby Boomer woman will have a waist/girth body measurement (range and tolerances) that differs from a "straight" Baby Boomer woman. The customized body measurement standards are bracketed into the new size groupings and used to fit apparel as provided with the present invention.

Early tests indicate that apparel produced according to the customized specifications identified herein fit over 75% of a target group of consumers without need for alterations. This is contrasted with the fact that apparel produced according to current standards (ASTM) only fit 13% of consumers.

Real Fit Model

Another feature of the present invention is the use of a "real fit model," which, as used herein, is a real individual with body measurements that fall within the customized measurement standards (with tolerances) for a given new size grouping (e.g., new sizes based on body type, age, ethnicity, etc., as described above). The customized measurement standards are those obtained with the present invention by researching and analyzing apparel-related data, as described above. Such data may be obtained from a large database (e.g., SizeUSA) as well as from one or more of the following, including market research, survey, questionnaire, focus group, interview, and combinations thereof.

The real fit model used herein differs from those fit models used by industry standards, in which suppliers of mass-produced garments have widely varying standards, but each supplier generally bases the design of a particular garment on a sizing standard using a fit model of a single body type and the dimensions of a specific size (i.e., size 6 or 8) and age (i.e., generally under 35 years). To create the same garment in larger sizes, the suppliers generally "grades up" to determine the sizing standards for each fit location on the garment for each larger size, increasing the sizes of the various areas of the garment by the same proportion. This grading is performed with no regard to body type-, age- or ethnicity-related variances.

The present invention takes into account the fact that measurements of a larger body of the same age are not larger than a smaller body by the same proportion at all body points of measurement. Because the present invention implements a new size grouping for each target consumer group that takes into account body type, age, and/or ethnicity, the present invention may provide for real fit models that match each of the new size groupings in a target population. At a minimum, the present invention identifies the most common new size grouping within a target population and provides for at least one fit model with body measurements that fall within the customized standards (with tolerances). In some instances, at least two real fit models are identified for each size grouping. For example, because Baby Boomer women exhibit at least two body type preferences—curvy and straight—two real fit models for each new size grouping are used, e.g., one curvy size 10 and one straight size 10. In other instances, at least four real fit models are identified for each size grouping and body type preference. Here, for a size "10" grouping, there may be a real fit model for a curvy top size 10, another for a straight top size 10, yet another for a curvy bottom size 10 and still another for a straight bottom size 10. Such schemes are beneficial for fitting separate garments, such as shirts, pants, skirts, and shorts.

Thus, the present invention provides for fit specifications at each fit location (e.g., body point) on a garment (apparel) that is based on customized body measurement standards using at least one real fit model for each target group. Real fit models are also used to perfect the block that is prepared for each garment.

Sample Garment

For a selected target group, an initial step in fitting a garment includes identifying at least one real fit model for the target group. In one embodiment, the middle (e.g., mean) of the new size grouping for a particular target group is determined (based on analysis of the original database from which the target group data was selected). For example, the middle size grouping for a Baby Boomer woman may be a size 12. On the other hand, the middle size grouping for a teen female may be a size 8.

Once the middle of the new size grouping is determined, at least one fit model for that size grouping is identified. The identified real fit model will have body measurements that fall within the customized measurement standards previously established for that new size grouping and target group. The real fit model's measurements at each particular body point of measurement is used to create a sample garment. The sample garment is then made to fit well, if not perfectly, on the real fit model.

While the custom body measurement standards of the present invention are never compromised in a sample garment, a real fit model provides important information regarding the amount of fabric ease, comfort and wearability that may be expected. Because a garment is not a second skin, it must incorporate various amount of ease so that the wearer can sit, walk, breathe, etc.

Grading Rules

Another feature of the present invention is the use of at least one of two grading rules as provided herein. One grading rule, referred to herein as applied grading rule, grades a sample garment based on customized body measurement standards retrieved from real data for target consumer group, such as a large database (e.g., SizeUSA). Applied grading rules are generally provided bi-directionally. This differs from linear grade rules used as an industry standard, in which grading is predominantly in one direction (as a sizing up) from a very small size (i.e. size 6).

With the present invention, the sample garment, which is generally sized to a fit model from a middle size grouping, is graded up as well as down. In one embodiment, the applied grading is provided for two sizes up and two sizes down. Other size gradients may be applied, as needed. After an applied grading, the graded garments are fit again on real fit models, wherein real fit models are identified by body measurements that fall within the customized body measurement standards for the new size groupings. Hence, for a Baby Boomer woman's curvy top that has a middle size grouping of "12," applied grading rules result in sample garment tops graded up to a size 16 and down to a size 8 after which the garments are refitted on a size 8 top fit model and a size 16 top fit model. The steps are repeated until the garment is graded for all appropriate sizes.

Refitting of a sample garment on a real fit model after a set number of applied gradings allows some or all of the graded garments to be altered to a real body before new grading rules are applied. If altered, then it is the altered sample garment that is graded again using the applied grading rules. As before, altered (or unaltered) garments may undergo one or more rounds in which applied grading rules are provided to sizes above and below a selected middle size. This process is continued until sample garments are prepared in all sizes for a particular target group.

A second grading rule, as used herein, is a preferred grading rule that include rules based on product preferences. Product preference rules are generally obtained from market research (e.g., surveys, interviews, questionnaires, etc) and include such things as design preferences (sleeve length, pant length, neckline, ease). Preferred fit preferences are often used to adjust the custom body measurement standards for a particular target group and/or body type. Preferably, preferred fit grading rules are used simultaneously with applied grading rules in order to obtain a garment with specific design features.

Custom Fit Sample

A custom fit sample, as used herein, is a garment in which fit specifications for all corresponding fit locations on the sample garment are perfected. A custom fit sample is generally provided for after the application of the above grading rule(s) and/or at least one fitting on a real fit model. Ideally, a custom fit sample is provided for each size for a selected target group.

Optionally, a custom fit sample is obtained after a back end fitting. Here, sample garments (after grading rules and/or fit model alterations are applied) are re-fit on a group of individuals selected from the target group. This group of individuals are not fit models, but individuals from the general target group population.

From custom fit samples, slopers, blocks and patterns are obtained. Importantly, blocks for each size are obtained only after grading rules and/or fit model alterations are made to a garment sample. In addition, additional fittings after the preparation of blocks are no longer required as the custom fit garments were already "altered" and "customized" to a particular target consumer group.

EXAMPLE A

For a selected consumer group (e.g., teen females, "Baby Boomer" women), identify a set of data for analysis and establish search criteria for the data, such as age. Query the data to establish new size groupings and any other indicators for that age. Queries may be based on qualitative or quantitative research (using focus groups, apparel-related databases, questionnaires etc.). Research is used to determine product attributes that include: fit and design. Fit product attributes includes fit, ease, sizing, etc. Design product attributes include "wearability" features, such as placement of zippers, pocket placement, sleeve lengths, fabrics, styles, colors, pricing, etc. Optionally, brand research may be conducted to identify successful apparel brands, product attributes, and designs sold to the target group.

New size groupings should lie within industry standard sizings. For example, women size groupings should be comparable to "Missing" industry sizes; teen female size groupings should be comparable to "Junior" industry sizes. Additional criteria such as ethnicity may be used to query the data further in order to identify For the target group, specific anthropometric data is analyzed to determine the number of apparel sizes to offer the target group. Specifically, this addresses whether additional sizes are required in order to fit significant segments of the target group.

For the target group, one or more predominant body types are selected and are generally ones that best represent the target group. For example, common body types in middle-aged women are average and full tops and straight and curvy bottoms. These shapes may exist in any combination, e.g. full/straight, average/straight, full/curvy, average/curvy. Thus, specific size-shape combinations are selected that will fit the identified body type indicators. This is similar to bra sizing, which is not limited to a "34," but includes 34A, 34B, 34C, 34D, etc., in order to fit all women with a ribcage measurement that is a 34.

Body points of measurement are then selected. This may include all or some of those commonly used in the industry. Critical body points are those generally identified by the target group, such as through research (focus group, survey, brand research, etc). Critical body points often correspond with preferred fit points and product attributes.

Following selection of body points of measurement, custom body measurement standards are established at all selected points of measurement for each apparel size and body type. These will be translated into fit specifications. Preferably, this process takes advantage of three-dimensional body scanning data from a large sample of the target population. Each customized body measurement standard should be representative of the target population. Tolerances are set for each customized body measurement standard.

Real fit models are identified for each apparel size and body type to be offered to the target group. Each real fit model should have appropriate body measurements at all selected body points of measurements as set by the customized body measurement standard for that size and body type. In some instances, real fit models are only required to have appropriate body measurements at critical points of measurement. Three-dimensional body scans may then be applied to the real fit models in order to determine body measurement standards for all other selected body points of measurement.

A sample garment (with design and appropriate fit specifications) is created for each body type and size. Because the fit of the sample garment is based on the customized body measurement standards, it will include all desired fit points and product attributes if these were included in the assessment of critical points of measurement. Sample garment fit is then checked on an appropriate real fit model and customized body measurement standards may be adjusted to improve the fit of the garment on the real fit model. The real fit model, again, is one selected from the target population.

EXAMPLE B

Conduct survey of a target population to determine common body measurements, body types, and preferences via: market survey (for analysis of research data of potential consumers' needs to determine preferences and body types); competitive analysis (to analysis target consumers' preferences for best fit); database analysis (e.g., SizeUSA national sizing database, in which participants have had bodies scanned using three-dimensional body scanning and body measurement software and for which criteria will be established followed by analysis of scanned data).

Establish customized body measurement standards for each size (and body-type) in range, based upon above survey results. In many cases, at least two body types are identified for each size. This is done by first determining relevant body points of measurement as well as secondary body points and unnecessary body points. Examples of commonly used body measurement standards are: bust; midriff; waist; high hip; low hip; mid-neck; neck to base; cross shoulder; side shoulder; shoulder slope; cross front (cf); cross back (cb); cf neck to waist; cb neck to waist; bust points around neck; bust point width; armhole; arm length from shoulder; arm length from hips; arm length from cb neck; upper arm length; forearm length; inside arm length; bicep; elbow; wrist; waist to hip; waist to knee; waist to ankle; waist height; hip height; crotch length; crotch to ankle; knee height; ankle height; thigh; knee; calf; ankle; total torso; seat spread; cb neck height; height. Then, database results (e.g., SizeUSA data) are analyzed to categorize common body types/measurements into new size groupings. Data for analysis should be that obtained from actual bodies, rather than averages that don't correspond to actual bodies. Customized body size measurements are compared with various industry standards and accepted industry resources. Customized body measurement standards are finalized for each new size grouping.

Identify real fit models that conform with established customized standards for body measurements and body types. Identification is generally through channels, such as model agencies, newspaper ads, scanned body databases with all appropriate measurements, and survey participants with appropriate measurements, as examples. Each potential real fit models must have their body measurements and body type checked, based on the customized standards. Preferably, hand measurements of each real fit model are taken by the same person for consistency. Obtain one real fit model for each size and body type. Scan fit models into a database.

Determine proper size range for the target group and body type. Identify middle of new size range. Use established (industry standard, e.g., ASTM) size numbering system or may establish new numbering system.

Perform competitive fit survey of "preferred fit" for target group. May use popular industry garment specifications for survey to determine target populations' preferred garment fits (including cathexis and wearability). Measure or identify specifications of preferred (sample) garment. Determine preferred ease, whenever possible.

Examine fit of preferred garments on one or more fit models. Establish (modify) customized body measurement standards (finished measurements) by size (and body type, if available) for each preferred garment. Add any minimum ease, where necessary. Note, unlike industry standards, preferred garment specifications (customized body measurement standards) are not established for only one size and graded up or down by a standardized percentage. Instead, one or more body types for each preferred garment is used and customized specifications for several sizes are obtained. For example, with two body types for a preferred garment, approximately five sizes are finished, such that there are 10 body type-size combinations. Each body type-size combination is graded up one size and graded down one size for total of seven sizes and 14 type-size combinations. Specification sheets are created for each body type-size combination.

Approve ease, where required. One or more slopers are checked with specifications sheets described above. One or more silhouettes, each in at least one size (preferably the middle size) are checked against customized body measurement standards for each size, to satisfy the amount of preferred ease. In addition, a database that has basic slopers for each preferred garment specification is created (this is based upon the customized body measurement standards and agreed upon minimum ease). Slopers may include as many styles as required (e.g., average top, curvy top, slim skirt, slim pant) and there is one sloper for each body type-size combination. Hence, a custom fit garment (e.g., preferred garment) is prepared based on each sloper.

Fit Approval: each custom fit garment is fit on a real fit model to establish slopers for each body type-size combination. Database and design will confer on fit. Final approval may be determined by the design.

All slopers and finished specifications are based upon customized body measurement standards and sizes. Necessary adjustments may be made using a real fit model before finalized slopers and specifications sheets. Duplicate slopers may be created, if required. Slopers are used to prepare blocks with fit tolerances.

Pattern are created based on above slopers. In many cases, where designs warrant multiple patterns, each pattern will be created for each size (based on specification sheet). Patterns may be made available for any garment and material (e.g., knits, wovens, tops and bottoms). In addition, new specification should be created for machine knits.

Custom fit garments are cut and sewn in sample fabrications based on created patterns and machine knits will be knit based on created specifications. Custom fit garments will be fit on a real fit model. Adjustments may be made for production. A design team should supervise and approve final custom fit garment, especially any final fittings.

Focus group, interview, survey, etc., of targeted population may be conducted. Focus group participants will try on custom fit garments. Participants will be surveyed for comments on styling, value, and fit.

The above findings (from the focus group, interview, survey, etc.) are used to finalize the customized body measurement standards (finished measurements for sheet specifications) for each size and body type. Focus group comments on slopers, specification, patterns, and/or fittings may be used by designers, producers, companies, etc., to create markers for small-, medium- or large-scale production of any garment.

EXAMPLE C

Figure 3:
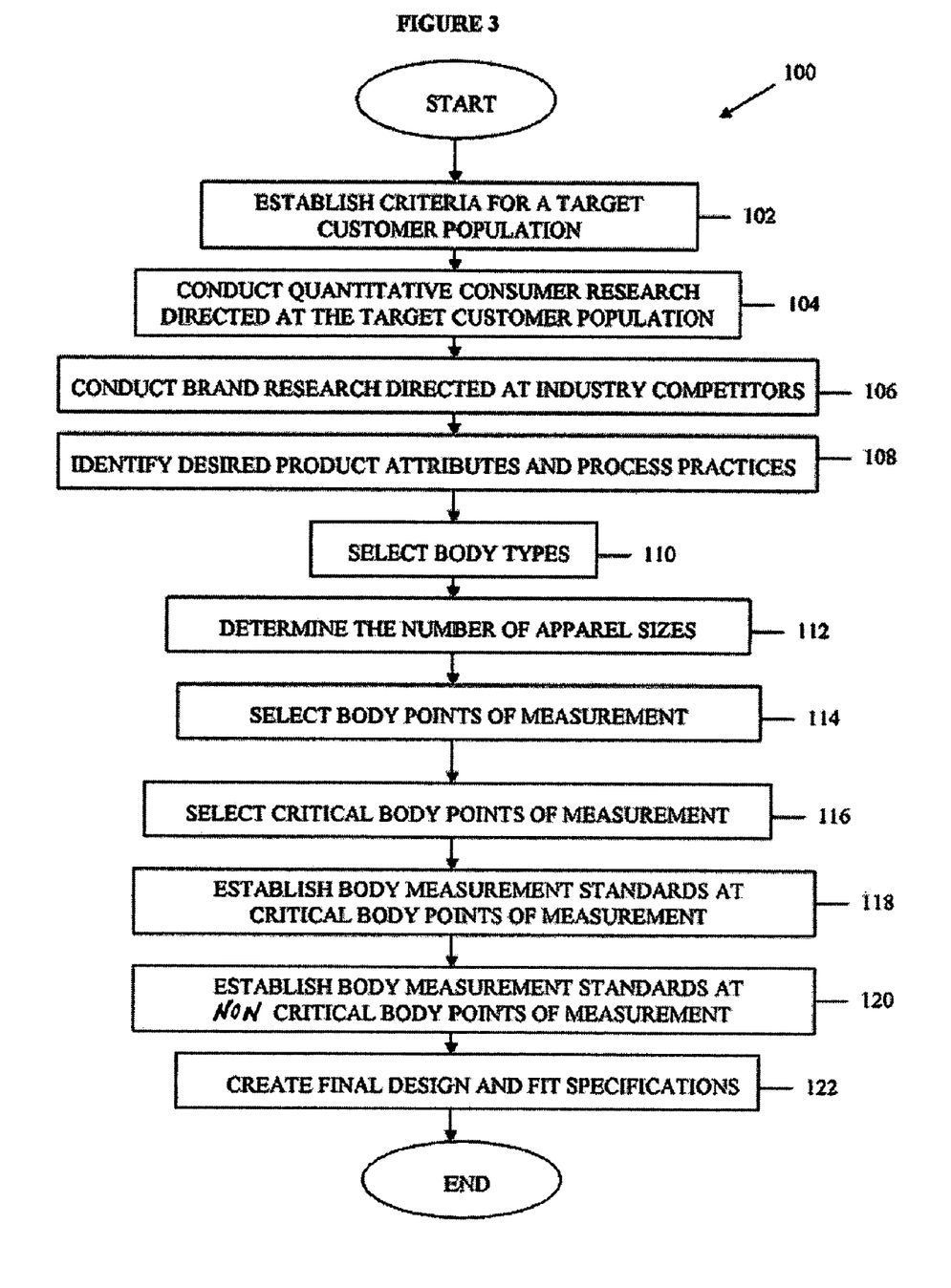
FIG. 3 is a flowchart illustrating inventive steps in accordance with one aspect of the present invention.

FIGS. 3–8 represent various additional aspects of the present invention. In FIG. 3, an embodiment 100 of the present invention is shown. This and other aspects, as referred to FIGS. 3–8 may be carried out by a designer, fit expert, or other individual or group of individuals involved in aspects of fitting apparel.

For FIG. 3, 102 describes the step of establishing criteria for a target consumer population. The target consumer population may be any group of consumers, especially those not satisfied with the fit and design of apparel currently being offered, such as "Baby Boomer" women within the age range of 35 to 55. At step 104, quantitative consumer research directed at the target consumer group is conducted. Optionally, brand research directed at industry competitors may be conducted, as shown at step 106. Steps for conducting brand research are more fully explained in FIG. 5. Proceeding to step 108, desired product attributes and process practices for a design of an apparel are identified by the target consumer group.

Continuing to step 110, at least two predominant body types that exist in the target consumer group are identified. A body type is typically the general shape of an individual. Moving to step 112, a number of apparel sizes to offer to the target consumer group is selected. This is generally determined after assessing the range of body sizes for the target group. At step 114, body points of measurement 14 (as shown in FIG. 2) are selected and used in creating the apparel (garment). Body points of measurement 14 may include all or less than all of the body points of measurement 14 commonly used in the industry. In addition, new body points of measurement may be added as determined from reviewing and analyzing the quantitative data provided by the target group. At step 116, critical body points of measurement 34 (as shown in FIG. 2) are determined from reviewing and analyzing step 108.

At step 118, customized body measurement standards 12 are established, these may be critical and noncritical or new body points of measurement as identified for each target and body type. Steps for establishing customized body measurement standards 12 are further exemplified in FIG. 6. At step 120, customized body measurement standards 12 at non-critical body points of measurement 36 are established. Steps for establishing body measurement standards 12 at non-critical body points of measurement 36 are further exemplified FIG. 7. Finally, at step 122, final fit specifications (e.g., fit and design) for each garment, body type and size are determined, and further illustrated in FIG. 8.

Figure 4:
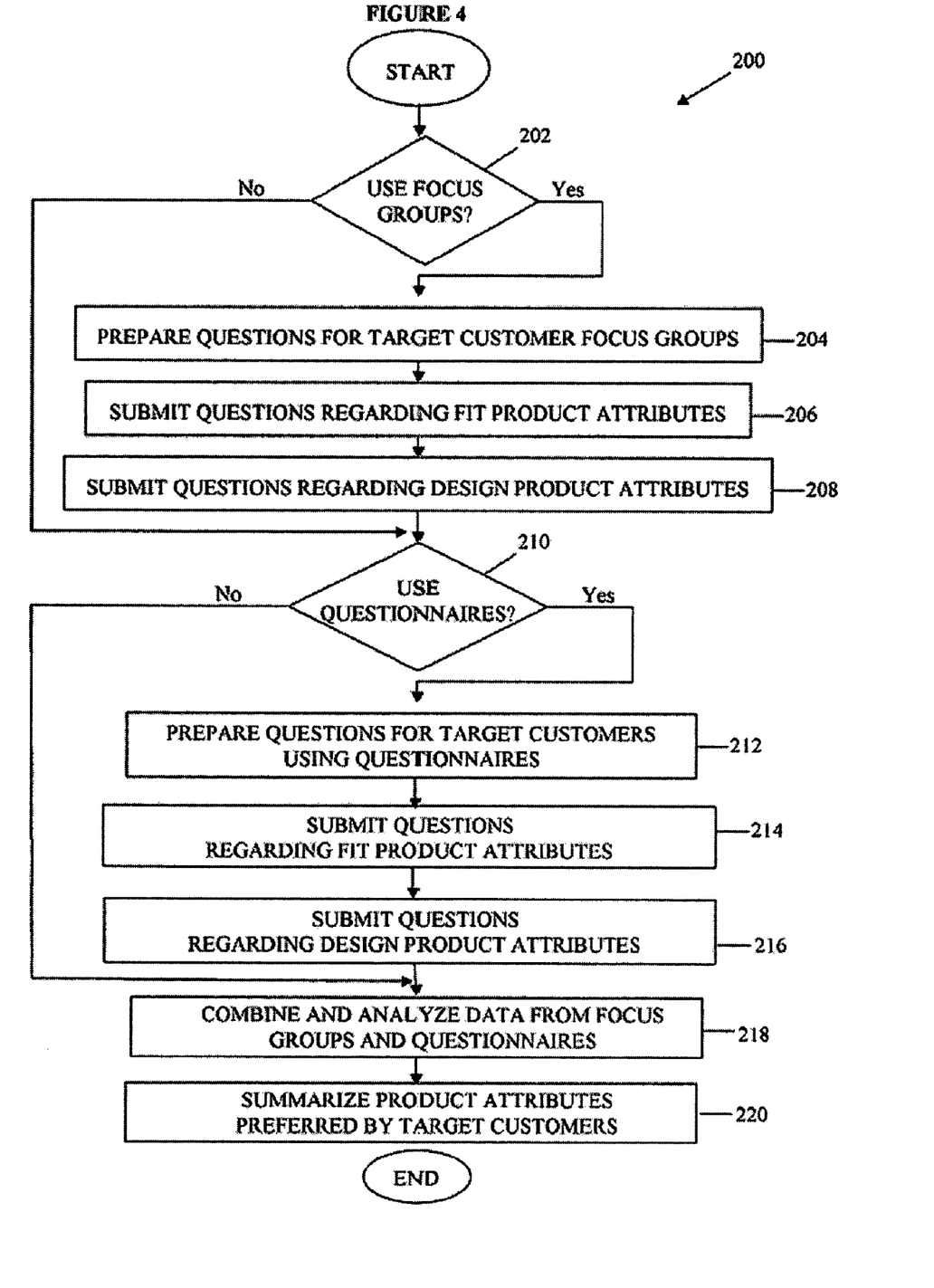
FIG. 4 is a flowchart illustrating additional inventive steps in accordance with one aspect of the present invention.

FIG. 4 illustrates view 200 with several steps that aid in conducting quantitative consumer research directed at the target consumer population in step 104. (See FIG. 3) At step 202, there is a determination as to whether or not to use one or more focus groups. If not used, then step 210 is next. If used, then questions are prepared in step 204, including those related to fit product attributes (step 206) and design preferences (step 208). Preferably, the focus group includes members of the target group.

At step 210, a second determination as to whether or not to submit questionnaires to a target consumer group is also made. If not used, then step 218 is next. If questionnaires are used, questions are prepared and submitted (step 212), including questions relating to fit product attributes (step 214) and questions relating to design preferences (step 216). Questionnaires may be distributed to the target consumers in a variety of ways, including person-to-person, by electronic mail and/or by U.S. mail. At step 218, all the above information (from steps 202–216) is collected and analyzed. At step 220, the data, such as fit product attributes and design preferences, are summarized and may be used to identify preferred attributes for step 108. (See FIG. 3)

Figure 5:
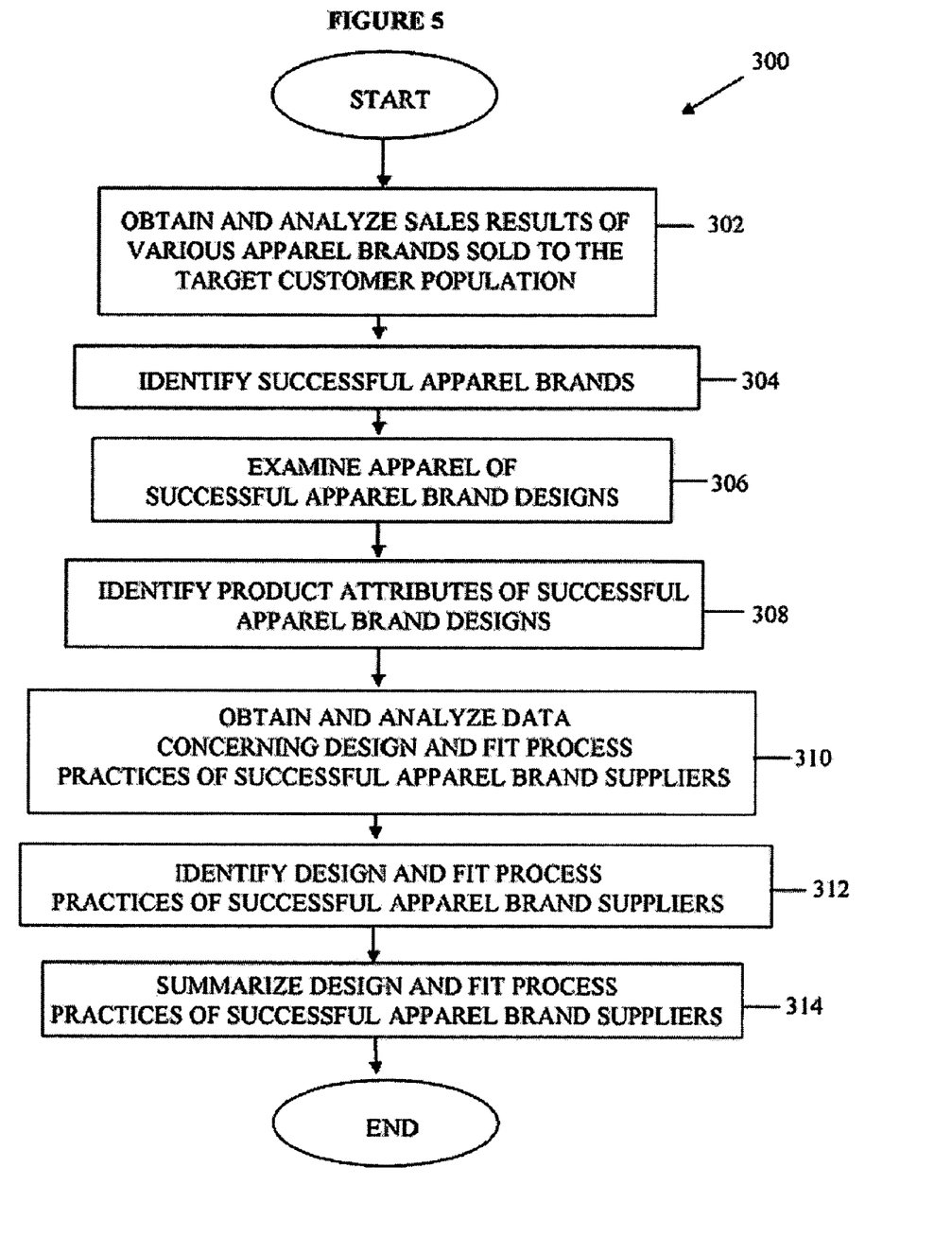
FIG. 5 is a flowchart illustrating yet more inventive steps in accordance with one aspect of the present invention.

FIG. 5 illustrates view 300 with steps that may be implemented when conducting market or brand research, as shown in step 106 of FIG. 3. Such research may be used to evaluate a number of apparel sources, including competitors and their products. For example, at step 302, sales results of one or more apparel brands sold to the target consumer group are obtained and analyzed. Using results of the analysis, successful apparel designs (step 306) and product attributes (step 308) are identified. Next, at step 310, data concerning the design and fit are analyzed. Results of step 310 aid in identifying design, fit and other practices of successful brands and their suppliers and are summarized in step 314 in order to be used, as needed, in step 108 of FIG. 3.

Figure 6:
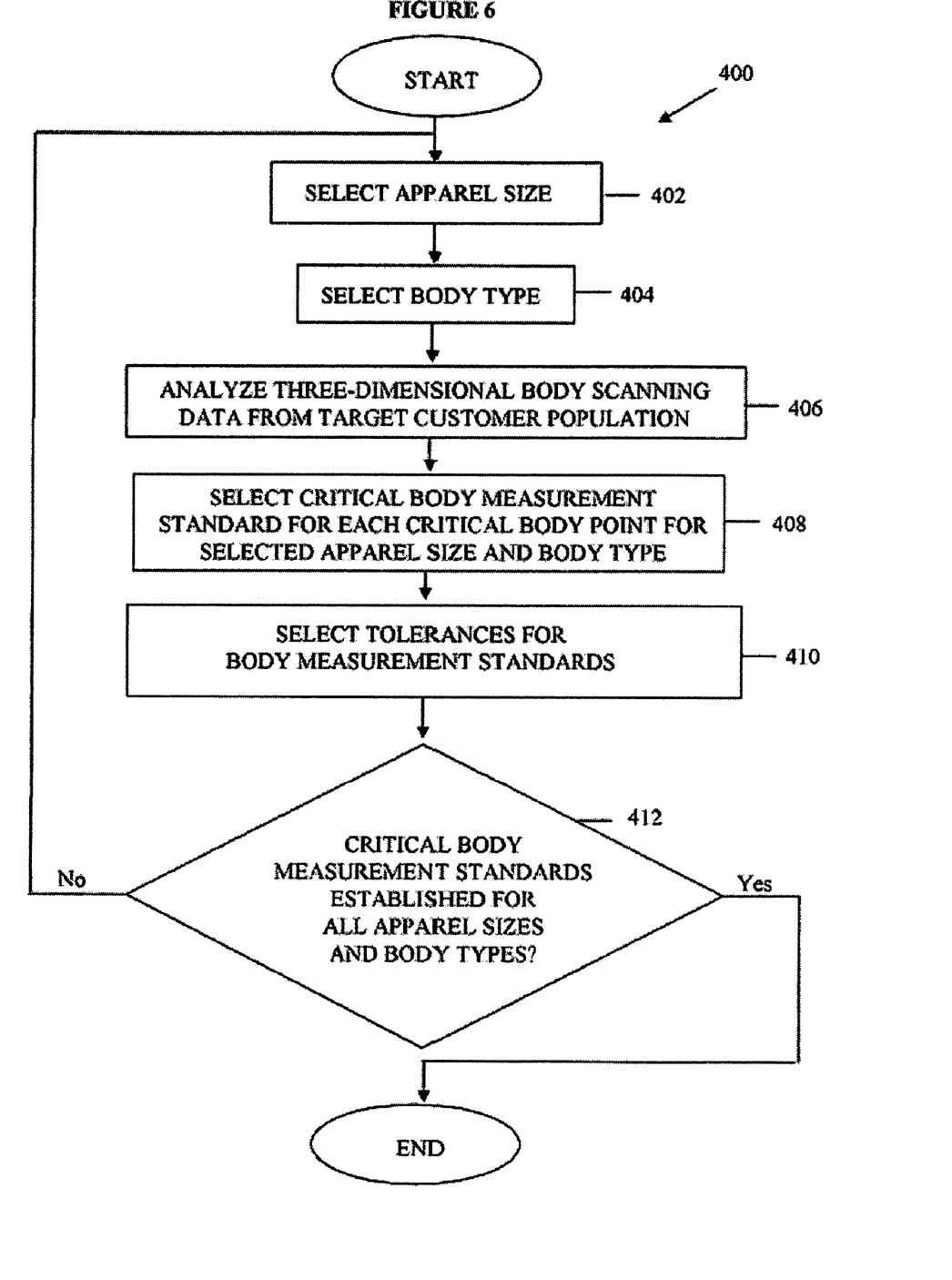
FIG. 6 is a flowchart illustrating still more inventive steps in accordance with one aspect of the present invention.

FIG. 6 illustrates view 400 with several steps that may be used to establish customized body measurement standards 12 for step 118 of FIG. 3. For example, at step 402, an apparel size is selected. This may be performed after analysis of desired fit and product attributes. (See step 108 of FIG. 3). At least one body type identified in step 110 of FIG. 3 is then selected at step 404. Next, at step 406, three-dimensional body scanning data from a sample of the target population is obtained (e.g., from an apparel related database such as SizeUSA). At step 408, for each selected apparel size and body type, critical body points of measurement are identified. These should be representative of each target consumer group. Proceeding to step 410, tolerances for the customized body measurement standards are also provided. At step 412, there is a determination as to whether the customized body measurement standards have been established for all apparel sizes and body types. If so, then no further analysis is required. If not, then another apparel size and/or body type is selected and steps 404 through 412 are repeated.

Figure 7:
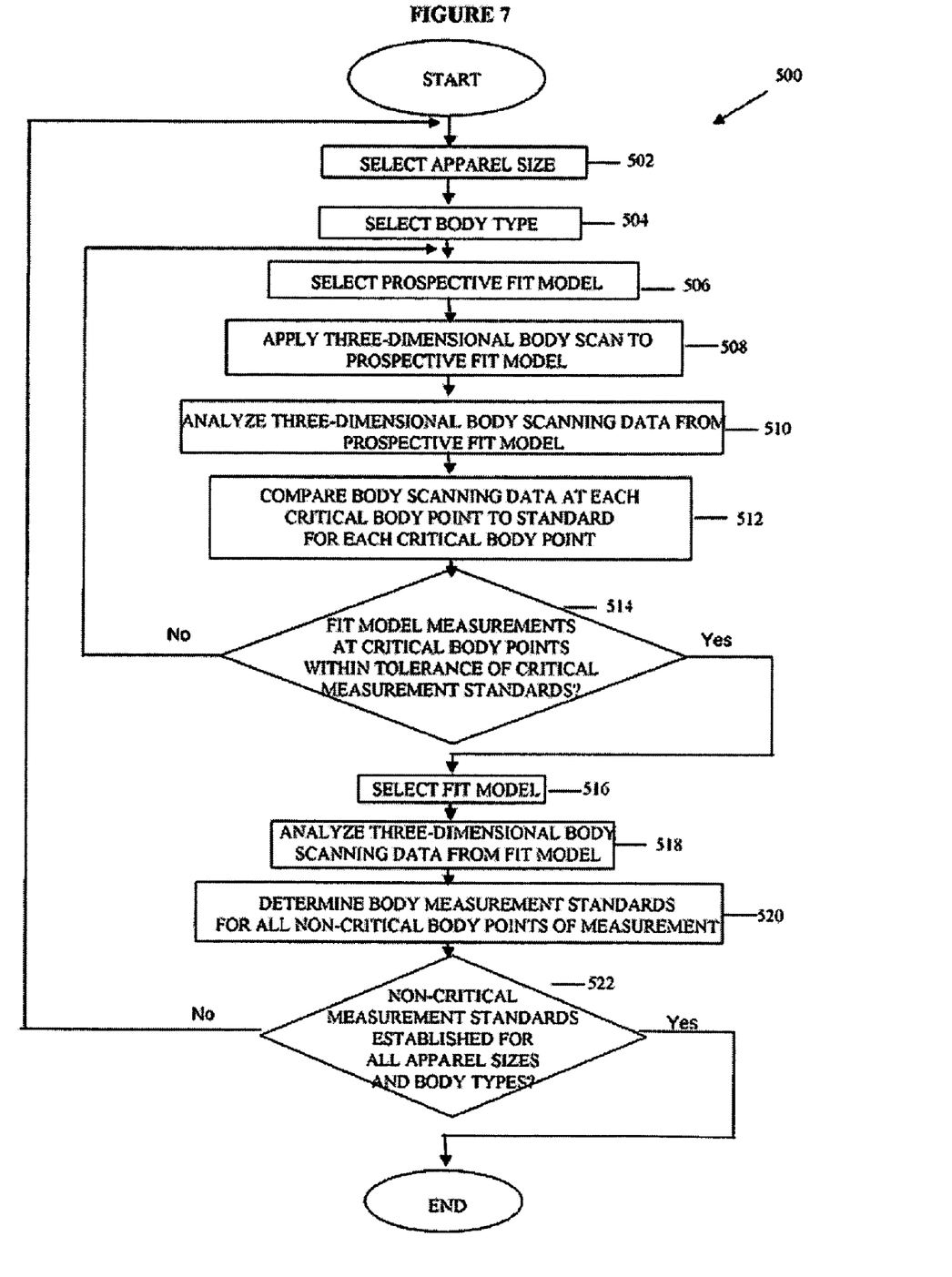
FIG. 7 is a flowchart illustrating more inventive steps in accordance with one aspect of the present invention.

FIG. 7 illustrates view 500 and many steps that may be taken to establish body measurement standards non-critical body points of measurement (as used in step 120 of FIG. 3). At step 502, an apparel size is selected, the apparel size being one selected in step 402 of FIG. 6. At least one body type identified in step 110 of FIG. 3 is then selected at step 504. At step 506, a fit model is selected. Preferably the fit model has body measurements that conform with customized body measurement standards. Alternatively, the fit model may be an individual selected from the target consumer group. At step 508, a three-dimensional body scan is applied to the fit model to generate measurement data at all selected body points of measurement. Proceeding to step 510, the measurement data is analyzed. At step 512, the fit model's body measurements at each critical body point of measurement is compared to customized body measurement standards. At step 514, the fit model body measurements at each critical body point of measurement is evaluated as to whether it falls within previously set tolerances. If not, another fit model is selected. If so, the fit model selection is complete (step 516).

At step 518, the fit model's body measurements as determined by the three-dimensional scanning are analyzed. Customized body measurement standards are determined for non-critical body points of measurement (step 520). This process is repeated for all selected apparel sizes, body types and apparel designs for each target group (see step 522, wherein steps 504–522 are repeated). Once step 522 is completed, step 122 of FIG. 3 may be performed to create final design and fit specifications.

Figure 8:
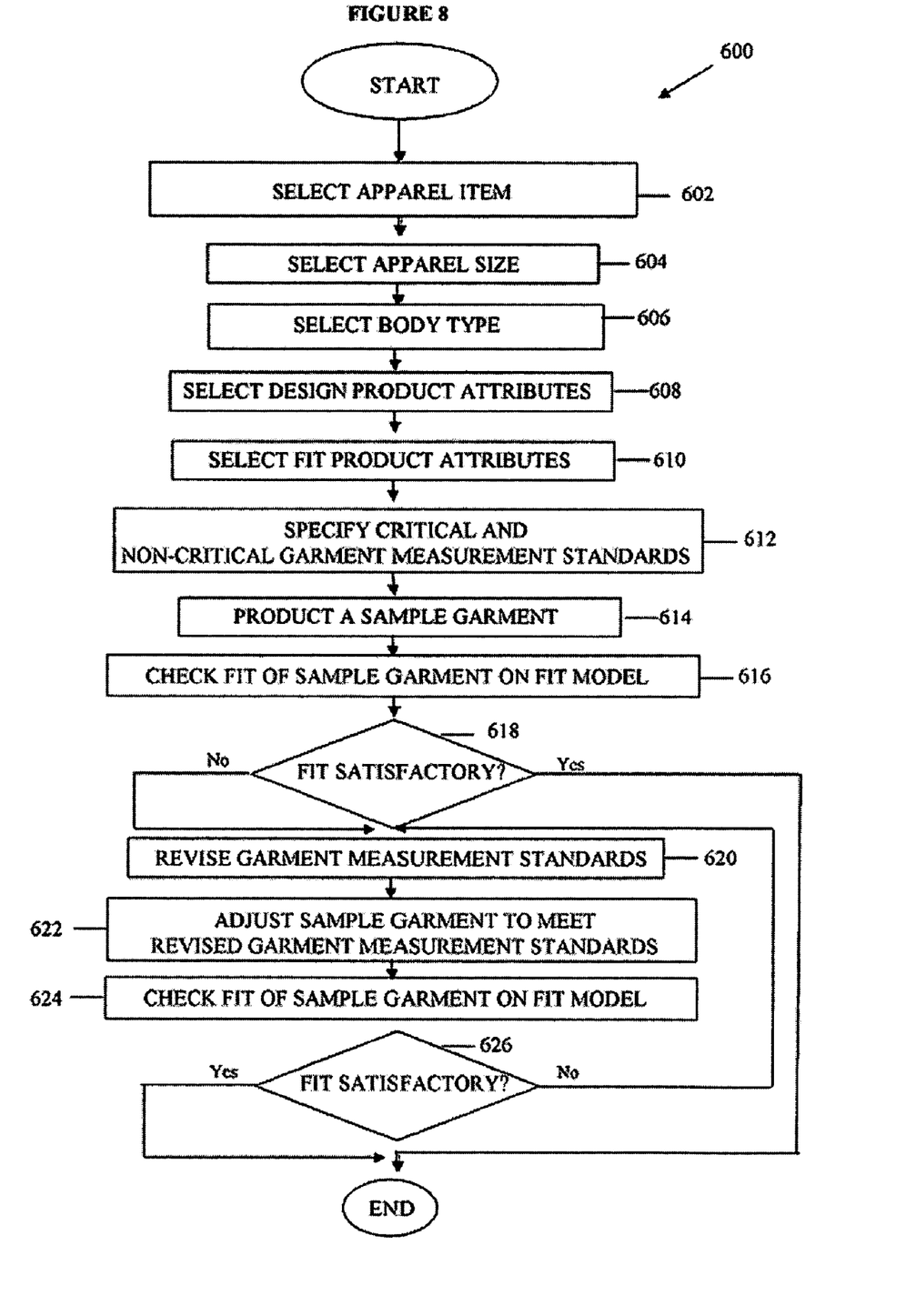
FIG. 8 is a flowchart illustrating still more inventive steps in accordance with one aspect of the present invention.

FIG. 8 illustrates view 600 and several steps that may provide for final design and fit specifications. At step 602, an item of apparel is selected. At least one size is also selected at step 604 as well as at least one body type (step 606). Next, at step 608, the summary prepared in step 220 of FIG. 4 is used, when needed, to include design attributes and/or fit attributes (step 610) to the garment. Attributes include ease and design preferences, and specifically at which body points of measurement they are to included. Proceeding to step 612, all customized measurement standards are specified for each garment. At step 614, material is cut and sewn to produce a sample garment that includes all the above specifications. The fit of the sample garment is checked on a real fit model at step 616. This may include how the garment, the way it lays on the model, the hemline, sleeve length, etc. The real fit model may also provide input as to the fit of the sample garment. At step 618 if the fit is satisfactory, the process is complete and a custom fit garment may be created. If not, then step 620 is next.

At step 620, revision(s) to the customized body measurement standards are made at all body points of measurement where the fit is considered unsatisfactory. At step 622, the sample garment is adjusted at such unsatisfactory body locations based on revised customized body measurement standards. The sample garment is then checked again on a real fit model at step 624. If such a fit is still unsatisfactory (step 626), then steps 620–624 are repeated again until a satisfactory fit achieved.

Thus, what has been disclosed are systems and methods for designing apparel to satisfy design and fit preferences of a target consumer population using the following: (a) quantitative research and analysis directed at the target group; (b) competitive brand research and analysis; (c) one or more predominant body types that exist in the target population; (d) fit models representative of the target consumers' sizes, body types and age group; (e) body measurements of the fit models using three-dimensional body scanning; (g) fit by size based on fit model body measurements rather than grading; and (h) design and fit specifications for each garment and each body type and size based on target consumer preferences.

These and other embodiments show that the present invention is capable of: satisfying design and fit preferences of one or more target consumer groups using quantitative and qualitative research and analysis directed at each target group; competitive brand research and analysis that take into account fit points and product attributes; identifying body types that exist in each target group; using fit models representative of each target group (e.g., based on size, body type, ethnicity, and age); determining customized body measurement standards for mass-production using fit models as well as three-dimensional body scanning data; providing apparel fit by size, ethnicity, and/or body type based on use of "real" fit models and real body measurements rather than grading rules alone; applying grading rules in combination with real fittings in order to properly adjust garments by size rather then proportionally adjusting garments from a single size; and establishing design and fit specifications for any garment, body type and size based on target group preferences.

A further advantage of the present invention is that it delivers slopers, blocks (with or without ease), starter patterns, grading rules, customized body measurement standards, written specification, research-driven assortments, manufacturing standards, garment labels, hangtags, product preferences, and consumer-driven preferences for any apparel design and size. Deliveries can be based on any target consumer audience or group identified through research and analysis of data (e.g., SizeUSA data), focus groups, market research, surveys, and the like. Likewise, deliveries can be mass produced for large-scale production, apparel manufacturers, and retail use. Additionally, the deliveries apply to any apparel category (e.g., missy, tall, junior, plus etc.), apparel classification (e.g., business wear, casual wear, teen wear, etc.), age group (e.g., children, teen, "baby boomer," 20–35, etc.), and ethnicity.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

What is claimed is:

1. A method of providing a garment fit to a target consumer group that includes a plurality of pre-selected persons, the method comprising the steps of:
   determining common body types for the target consumer group;
   establishing customized body measurement standards for each body type;
   selecting at least one real fit model for each body type;
   creating at least one sample garment for each body type in a range of sizes using non-linear grading rules;
   checking each sample garment on a fit model selected for each size and body type;
   preparing a block for each sample garment for each body type after applying the non-linear grading rules and checking on a fit model; and
   using the block to provide a number of garments fit for the target consumer group.

2. The method of claim 1, wherein determining common body types for a target consumer group includes research and quantitative and qualitative analysis of data about the target consumer group.

3. The method of claim 2, wherein the data is a data set obtained from the Textile Technology Corporation.

4. The method of claim 1, wherein body types are selected from the group consisting of average, curvy, straight, pear-shaped, round, slim, hourglass, and combinations thereof.

5. The method of claim 1, wherein design preferences are determined for the target consumer group and used to prepare the sample garment.

6. The method of claim 1, wherein grading rules are selected from the group consisting of applied grading rules, preferred grading rules, and combinations thereof.

7. The method of claim 1, wherein the block is created from slopers and used to prepare a starter pattern.

8. The method of claim 1, wherein the target consumer group is selected from a group consisting of an age group, ethnic group, gender, and combinations thereof.

9. The method of claim 1, wherein the sample garment is initially applied to a fit model of a specific size.

10. The method of claim 9, wherein the specific size is the middle of the range of sizes.

11. The method of claim 1, wherein a real fit model is used to check sample garment fit before the block is prepared.

12. The method of claim 1, wherein grading rules are applied to the sample garment after adjusting the sample garment to the selected real fit model.

13. The method of claim 1, wherein the method is for production of the garment at any scale.

14. A garment provided by the method of claim 1.

15. A block provided by the method of claim 1.

16. A system for preparing a custom fit garment comprising:
    quantitative and qualitative data, including body point measurements for common body types obtained from a target consumer group used to establish customized body measurement standards for each body type, wherein the target consumer group is a plurality of pre-selected persons;
    at least one sample garment for each body type created from the customized body measurements standards;
    at least one first real fit model for each body type with body measurements that fall within the customized body measurement standards used to fit the at least one sample garment;
    one or more non-linear grading rules to create the at least one sample garments in a range of sizes for each body type of the target consumer group; and
    at least one second fit model for each body type selected from the target consumer group and used to perfect the fit of the sample garment and prepare a number of custom fit garments for each body type of the target consumer group.

17. The system of claim 16, wherein quantitative and qualitative data comprise physical and preferential data about the target consumer group selected from the group consisting of an apparel-related database, market research, survey, questionnaire, interview, focus group, and combinations thereof.

18. The system of claim 16, wherein the sample garment incorporates desired fit points and product attributes obtained from the target consumer group.

19. The system of claim 16, wherein one or more grading rules are selected from the group consisting of applied grading rules and preferred grading rules.

20. The system of claim 16, wherein the at least one first real fit model is for each size in the size range used to fit the sample garment.

21. The system of claim 16, wherein customized body measurement standards are adjusted with the at least one first real fit model.

22. The system of claim 16, wherein the custom fit garments are used to establish slopers, blocks, and patterns for production of each custom fit garment.

23. The system of claim 22, wherein the production is selected from the group consisting of small-scale, medium-scale, and large-scale.

24. The system of claim 16, wherein the custom fit garment is perfected after fitting on one or more individuals selected from the target consumer group.

25. A custom fit garment provided by the system of claim 16.

26. A method of providing a custom fit garment comprising the steps of:
    selecting a target group based on at least one criteria, wherein the target group is a plurality of pre-selected persons;
    identifying at least one common body type for the target group;
    providing size groupings for each body type;
    establishing customized body measurement standards for at least one size in the size grouping for each body type;
    creating a sample garment for the at least one size for each body type;
    checking fit of the sample garment on a real fit model having body measurements that conform with the customized body measurement standards;
    applying non-linear grading rules to the sample garment to obtain sample garments for the entire size grouping;
    checking fit of each sample garment at selected sizes using real fit models having body measurements that conform with the customized body measurement standards for each size; and creating a number of custom fit garments for each body type and size grouping after fits are checked.

27. The method of claim 26, wherein fit is checked using individuals from the target group.

28. The method of claim 26, wherein identifying at least one common body type is obtained from data about the target group that is quantitative and qualitative.

29. The method of claim 26, wherein non-linear grading rules are applied to sizes above and below the at least one size after which the fit is checked on a real fit model.

30. The method of claim 26, wherein the customized body measurement standards are adjusted after checking the fit.

31. Improved grading rules provided fat a garment comprising:
   applied grading rules that linearly grade the garment from a selected size in a size grouping; and
   preferred grading rules that non-linearly grade the garment from a selected size in the size grouping, wherein the combination is used to prepare a number of custom fit garments.

32. An improved method of fitting a garment comprising the steps of:
   creating a first garment at a size that is in the middle of a size grouping for a particular body type;
   checking the fit of the first garment on a real fit model and making adjustments to the first garment where fit is unsatisfactory, wherein the real fit model has body measurements within customized body measurement standards for the particular body type and size;
   using non-linear grading rules to obtain new sizes above and below the first garment size;
   rechecking the fit of one or more new sizes on a real fit model and adjusting the fit of the first garment when unsatisfactory; and
   adjusting the customized body measurement standards when fit is unsatisfactory to provide a number of second garments for the entire size grouping and the particular body type.

33. A set of garments for a target consumer group, wherein the target consumer group is a plurality of pre-selected persons having two or more body types and the set of garments are of defined sizes, and wherein each defined size includes two or more garments shaped and fitted to the two or more body types using non-linear grading rules and at least one real fit model for each body type.

* * * * *